(12) United States Patent
Bharathi

(10) Patent No.: US 11,745,685 B2
(45) Date of Patent: Sep. 5, 2023

(54) OCCUPANT PROTECTING SYSTEM

(71) Applicant: Volvo Car Corporation, Gothenburg (SE)

(72) Inventor: Sunitha Karthikeya Bharathi, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/534,559

(22) Filed: Nov. 24, 2021

(65) Prior Publication Data
US 2023/0158985 A1 May 25, 2023

(51) Int. Cl.
*B60R 21/0136* (2006.01)
*B60R 21/015* (2006.01)
*B60N 2/02* (2006.01)
*B60R 21/207* (2006.01)
*B60N 2/04* (2006.01)
*B60N 2/427* (2006.01)
*B60R 21/01* (2006.01)
*B60R 21/231* (2011.01)

(52) U.S. Cl.
CPC ........ *B60R 21/0136* (2013.01); *B60N 2/0276* (2013.01); *B60N 2/04* (2013.01); *B60N 2/4279* (2013.01); *B60R 21/01512* (2014.10); *B60R 21/01554* (2014.10); *B60R 21/207* (2013.01); *B60R 21/23138* (2013.01); *B60R 2021/01286* (2013.01); *B60R 2021/23169* (2013.01)

(58) Field of Classification Search
None
See application file for complete search history.

(56) References Cited

U.S. PATENT DOCUMENTS 5,626,203 A * 5/1997 Habib .................. B60N 2/0276
180/274
2018/0222360 A1 8/2018 Fournier
(Continued)

FOREIGN PATENT DOCUMENTS

CN 102985294 B * 3/2017 ......... B60R 21/0132
CN 115123038 A * 9/2022
(Continued)

OTHER PUBLICATIONS

EP3670251A1 translation (Year: 2020).*
Extended EP Search Report for EP Application No. 22208714.0 dated May 8, 2023.

*Primary Examiner* — Faye M Fleming
(74) *Attorney, Agent, or Firm* — Amin, Turocy & Watson, LLP

(57) ABSTRACT

The present description relates to an occupant protecting system for a vehicle, a vehicle comprising such an occupant protecting system and an occupant protecting method for such a vehicle. The occupant protecting system comprises a seat assembly, a sensor unit, an actuator unit and a control unit. The sensor unit is configured to generate crash monitoring data of the vehicle. The control unit is configured to determine a crash type based on the crash monitoring data in case of a collision of the vehicle. The actuator unit comprises a pyrotechnic element. The actuator unit is arranged at the seat assembly and capable to adjust a position of the seat assembly. The control unit is configured to cause the actuator unit based on the crash type.

20 Claims, 1 Drawing Sheet

(56) References Cited

U.S. PATENT DOCUMENTS

2020/0079256 A1 3/2020 Behrens
2020/0298984 A1 9/2020 Walker

FOREIGN PATENT DOCUMENTS

| EP | 3670251 A1 | * | 6/2020 | |
|----|------------|---|--------|----------|
| WO | WO-2019004409 A1 | * | 1/2019 | ............... A47C 7/50 |
| WO | 2020052766 A1 | | 3/2020 | |
| WO | 2020052767 A1 | | 3/2020 | |
| WO | WO-2022074055 A1 | * | 4/2022 | |

* cited by examiner

OCCUPANT PROTECTING SYSTEM

TECHNICAL FIELD

The present disclosure relates to an occupant protecting system for a vehicle, a vehicle comprising such an occupant protecting system and an occupant protecting method for such a vehicle.

BACKGROUND ART

A conventional vehicle comprises various sensors to monitor a crash situation of the vehicle and classifies a type of the crash. Based on such information, suitable protection means such as an airbag system is activated in order to enhance safety and protection to occupants.

However, in case of a rear and/or side crash of a truck or a lorry against a passenger vehicle, an underride crash situation of the vehicle may occur, which can cause serious injuries of the occupants even use of the protection means.

SUMMARY

Hence, there still may be a need to provide an improved occupant protecting system, which may increase safety of occupants in a vehicle.

The problem is at least partially solved or alleviated by the subject matter of the independent claims of the present disclosure, wherein further embodiments are incorporated in the dependent claims. It should be noted that the aspects of the disclosure described in the following apply to the occupant protecting system for a vehicle, the vehicle comprising such an occupant protecting system and the occupant protecting method for such a vehicle.

According to the present disclosure, an occupant protecting system for a vehicle is presented. The occupant protecting system comprises at least one seat assembly, a sensor unit, at least one actuator unit and a control unit. The sensor unit is configured to generate crash monitoring data of the vehicle. The control unit is configured to determine a crash type based on the crash monitoring data in case of a collision of the vehicle. The actuator unit is arranged at the seat assembly and capable to adjust a position of the seat assembly. The control unit is configured to cause the actuator unit to adjust the position of the seat assembly based on the crash type in case of the collision of the vehicle. The actuator unit comprises a pyrotechnic element.

The occupant protecting system according to the present disclosure improves a protection means of a vehicle based on a crash type. By utilizing various sensor technologies arranged at the vehicle, the occupant protecting system may predict a crash situation more precisely, thus activate protection means properly. Hence, safety of occupants in the vehicle may be increased.

The seat assembly may be arranged in the vehicle. Preferably, the vehicle may comprise two or more seat assemblies, which may be arranged in a driving direction, an opposite or a parallel direction relative to the driving direction of the vehicle. The seat assembly may be a single occupant seat or a multiple occupant seat. The seat assembly may be arranged in a front row, a middle row and/or a rear row.

The sensor unit may comprise at least one, preferably a plurality of sensor elements. The sensor unit may be configured to detect an environment and/or surroundings of the vehicle. In case of a collision, the sensor unit may generate crash monitoring data of an impending crash such as field data comprising geographic position data and/or crash geometric data of the vehicle and/or a crashed object. The crashed object may be one or more vehicles, (motor-)bikes, pedestrians, trees, buildings, lamppost or the like.

The control unit may be an electronic control unit (ECU) of the vehicle and configured to receive the crash monitoring data generated by the sensor unit. The control unit may classify the crash type based on the crash monitoring data. The crash type may comprise a head-on crash, a side on crash, a rear-end crash, a rollover crash and/or an underride crash. The crash type may also comprise a single vehicle collision, a vehicle-vehicle collision, vehicle-person collision and/or a vehicle-article/fixture collision.

In general, the actuator unit may comprise an electric motor and it may be configured to set a preferred position of the seat assembly for an individual occupant in the vehicle. The position of the seat assembly may be adjusted in a vertical direction, e.g. height, a horizontal direction, e.g. distance from a vehicle frame, and/or a diagonal direction, e.g. angle of a backrest portion of the seat assembly, relative to the driving direction of the vehicle.

In addition to the electric motor, the actuator unit may further comprise a pyrotechnic element. The pyrotechnic element may comprise an electrically initiated pyrotechnic actuator, which, upon activation, drives a piston to move a mechanism, which may quickly change the position of the seat assembly.

During driving, the seat assembly is generally set substantially upright such that head of the occupant may crash severely against the crashed object. The occupant protecting system may, however, prompt the control unit to actuate the actuator unit to immediately adjust the position of the seat assembly with respect to the crash type determined based on the crash monitoring data. The control unit may be further configured to determine space required to adjust the position of the seat assembly. Hence, safety of occupants in the vehicle may be increased.

In an example, the seat assembly comprises a seat portion and a backrest portion. The control unit is configured to cause the actuator unit to adjust the position of the seat portion and the backrest portion in case of the collision of the vehicle. The seat portion and the backrest portion may be adjusted separately or together. The seat assembly may further comprise a head portion, a foot portion and/or an arm portion, which may be individually or together adjusted by means of the actuator unit. The seat portion of the seat assembly may be arranged on a bottom of the vehicle and the backrest portion may be mounted at the seat portion. Alternatively, the seat portion and the backrest portion may be formed integrally.

The seat portion may be movable in a horizontal direction and/or vertical direction relative to the driving direction of the vehicle. The backrest portion may be pivotable relative to the seat portion such that the backrest portion may be adjusted from an entirely folded position on the seat portion to a completely spread out position relative to the seat portion. The control unit may prompt the actuator unit to adjust the position of the seat portion and/or the backrest position separately or together based on the crash type.

In an example, the actuator unit is configured to adjust an angle of the backrest portion of the seat assembly relative to the seat portion based on the crash type determined by the control unit. Since the backrest portion of the seat assembly may be pivotably arranged at the seat portion, the actuator unit may adapt the adjustment of the angle of the backrest portion based on the crash type and/or the crash monitoring data. In other words, the control unit may activate the pyrotechnic element of the actuator unit to recline the backrest to a certain angle required to protect the head of the occupant.

In an example, the actuator unit is configured to recline the backrest portion of the seat assembly at 180° relative to the seat portion based on the crash type determined by the control unit. In case of a collision such as underride, in which an upper portion of the vehicle between a glazing and a roof may be endangered, the control unit may predict such a situation based on the crash monitoring data and actuate the pyrotechnic element or actuator unit to spread the backrest entirely out immediately. Accordingly, a severe injury of the occupant may be avoided.

In an example, the actuator unit is configured to adjust a height of the seat assembly based on the crash type determined by the control unit. According to the crash type determined based on the crash monitoring data, the control unit may cause the actuator unit to move the seat assembly in the vertical direction relative to the driving direction of the vehicle, thus, adjust the height of the seat assembly against the vehicle crash.

In an example, the actuator unit is configured to reduce the height of the seat assembly based on the crash type determined by the control unit. If the control unit identifies based on the crash monitoring data that the upper portion of the vehicle between the glazing and the roof may be endangered, the control unit may cause the actuator unit by activating the pyrotechnic element to immediately lower the seat assembly in a vertical direction relative to the driving direction of the vehicle. Accordingly, a severe injury of the occupant may be avoided.

In an example, the crash type is an underride type, in which the vehicle being at least partially slidable underneath of an object. The term "underride" may be understood in that the crashed object is much bigger than the vehicle such that the vehicle can be drawn or even clamped under the crashed object. For instance, the object to be crashed may be a truck or a lorry and the vehicle may be a passenger vehicle. If the passenger vehicle crashes at a rear or lateral side of the truck, the passenger vehicle may be at least partially or even entirely drawn under the truck due to a height difference between two crashed vehicles.

Hence, the control unit may determine based on the collected crash monitoring data whether the impending collision may be such an underride crash type. Accordingly, the control unit may adjust the position of the seat assembly, preferably the height of the seat assembly and/or the angle of the backrest portion relative to the seat portion to avoid a severe injury of the occupant.

In an example, the sensor unit comprises a plurality of sensor elements. The sensor elements comprise at least one environment monitoring sensor element comprising at least one of a lidar element, a radar element, an ultrasonic element, or an optical imaging element. The sensor elements may be configured to capture surroundings of the vehicle and generate environmental monitoring data.

The lidar (light detection and ranging) element may comprise at least one light source and a receiver to measure a distance to a remote target. Whereas the radar element may determine a distance to the remote target by measuring a reflection of a high-frequency signal from the target. The ultrasonic element may utilize a single ultrasonic element for emission and reception of an ultrasonic signal reflected from the target. The optical imaging element may generate image data of the environment of the vehicle. By applying such sensor elements, a precise measurement of the field data comprising geographic position data and/or crash geometric data of the vehicle and/or a crashed object may be achieved.

In an example, the sensor elements further comprise at least one vehicle motion sensor element. The sensor unit may comprise a plurality of sensor elements arranged inside and/or outside the vehicle to detect operation conditions such as surrounding parameters, driving parameters and/or interior parameters of the vehicle. Among them, the vehicle motion sensor element may be configured to generate the crash monitoring data comprising longitudinal acceleration/deceleration sensor data, lateral acceleration/deceleration sensor data, a steering angle sensor data, etc. to predict the impending collision more precisely.

In an example, the sensor elements further comprise at least one cabin monitoring sensor element. The cabin monitoring sensor element may be configured to generate optical/vision data by capturing images of the vehicle cabin, which provides spatial information of the vehicle cabin. Accordingly, the control unit may cause the actuator unit and/or the pyrotechnic element based not only on the environment condition of a collision location but also on a cabin situation such as seat occupation, seat position, etc.

In an example, the occupant protecting system further comprises at least one airbag unit arrangeable in the vehicle. The airbag unit comprises at least one of a front airbag element, a knee airbag element, a lateral airbag element or an inflammatory side curtain. In general, the airbag unit is a safety device for occupants to minimize injury caused by directly striking between the occupants and a vehicle structure in case of a vehicle collision. The airbag unit may comprise an airbag arranged between a trim and a vehicle body, which can be opened to release and inflate immediately the airbag in case of the vehicle collision. Hence, in addition to the adjustment of the position of the seat assembly, e.g. the height of the seat portion and/or the angle of the backrest portion, the occupant protecting system may activate the airbag unit to protect the occupant in the vehicle.

In an example, the control unit is configured to selectively cause at least one of the actuator unit of each seat assembly or the airbag unit based on the crash type of the collision of the vehicle. The control unit may determine based on the crash type and/or crash monitoring data, which seat assembly is to be endangered due to the impending collision. According to this information, the control unit may activate the pyrotechnic element of the actuator unit and/or the airbag unit selectively to suitably and safely protect the occupant.

In an example, the occupant protecting system further comprises an activating means configured to manually activate the pyrotechnic element. The activating means may allow the occupant to activate the pyrotechnic element of the actuator unit manually, if the occupant fears the impending collision and/or the control unit or the actuator unit has any malfunction. The activating means may be formed as a button, switch or the like. Accordingly, the occupant may be also able to manually reduce the height of the seat portion and/or adjust the angle of the backrest portion of the seat assembly.

In an example, the occupant protecting system further comprises two or more seat assemblies. Each seat assembly comprises an individual actuator unit. The control unit is configured to allow each actuator unit of the seat assemblies to operate independently of each other. Conventionally, a passenger vehicle comprises more than one seat assemblies. Hence, the occupant protecting system may be configured to control the seat assemblies individually and/or together, particularly in case of the vehicle collision.

The control unit may determine the crash type based on the crash monitoring data generated by the sensor unit. In other words, the control unit may evaluate the field data, vehicle operation data, cabin monitoring data and predict the impending collision such that the control unit may individually and precisely operate the pyrotechnic element of the actuator unit and/or the airbag unit of each seat assembly arranged in the vehicle.

In an example, at least two seat assemblies are arrangeable in a row relative to a travelling direction of the vehicle. The control unit is configured to estimate a distance between the seat assemblies for adjusting the position of each seat assembly and cause at least one of the actuator units to adjust the distance between the seat assemblies before adjusting the angle and/or the height of the seat assemblies.

The seat assemblies may be arranged in the vehicle in a row, at a lateral side parallel to the driving direction of the vehicle or individually set. Before adjusting the position of at least one seat assembly in case of the collision, the control unit may assess based on the collected cabin monitoring data if one or more seat assemblies to be adjusted may have enough space in the cabin to be lowered or reclined. In other words, the control unit may determine whether the distance between the seat assemblies needs to be adjusted and/or space of a luggage compartment is required. According to the assessment, the control unit may adjust the distance between the seat assemblies before adjusting the angle of the backrest portion and/or the height of the seat portion of the seat assemblies to safely operate the pyrotechnic element in case of the collision.

According to the present disclosure, a vehicle is also presented. The vehicle comprises an occupant protecting system. The occupant protecting system comprises at least one seat assembly, a sensor unit, at least one actuator unit and a control unit. The sensor unit is configured to generate crash monitoring data of the vehicle. The control unit is configured to determine a crash type based on the crash monitoring data in case of a collision of the vehicle. The actuator unit is arranged at the seat assembly and capable to adjust a position of the seat assembly. The control unit is configured to cause the actuator unit to adjust the position of the seat assembly based on the crash type. The actuator unit comprises a pyrotechnic element.

By utilizing various sensor technologies arranged at the vehicle, the occupant protecting system may predict a crash situation more precisely. Further, the pyrotechnic element arranged at the seat assembly may be activated immediately based on the crash type determined by the control unit. Hence, safety of occupants in the vehicle may be increased.

In an example, the actuator unit is configured to recline a backrest portion of the seat assembly at 180° relative to a seat portion of the seat assembly in case of an underride type of a collision.

For instance, in case of a collision between a passenger vehicle and a truck, the passenger vehicle may be at least partially drawn under the truck due to a height difference between two crashed vehicles. The control unit may predict such a situation based on the crash monitoring data and actuate the pyrotechnic element or actuator unit to spread the backrest entirely out immediately. Additionally or alternatively, the control unit may also actuate the pyrotechnic element to reduce a height of the seat portion and/or the seat assembly. Accordingly, a severe injury of the occupant may be avoided.

In an example, the occupant protecting system further comprises at least one airbag unit arrangeable in the vehicle. The control unit is configured to selectively cause the actuator unit of each seat assembly and/or the airbag unit based on the crash type of the collision of the vehicle.

Hence, in addition to the adjustment of the position of the seat assembly, e.g. the height of the seat portion and/or the angle of the backrest portion in case of the vehicle collision, the occupant protecting system may activate the airbag unit to protect the occupant in the vehicle. The control unit may determine based on the crash type and/or crash monitoring data, which seat assembly is to be endangered due to the impending collision. According to this information, the control unit may activate the pyrotechnic element of the actuator unit and/or the airbag unit of a particular seat assembly selectively to suitably and safely protect the occupant.

In an example, the vehicle comprises a luggage compartment. The control unit is configured to cause the actuator unit to at least partially occupy the luggage compartment for adjusting the seat assembly arranged adjacent to the luggage compartment. If the vehicle comprises more than one seat assemblies, space between the seat assemblies may not be enough to adjust the position of the seat assembly during the vehicle collision.

Before adjusting the position of at least one seat assembly, the control unit may assess based on the collected cabin monitoring data whether one or more seat assemblies to be adjusted may have enough space to be lowered or reclined. According to the assessment, the control unit may adjust the distance between the seat assemblies before adjusting the angle of the backrest portion and/or the height of the seat portion of the seat assemblies. If the space in the cabin is not enough, seat assembly may be also extended into the luggage compartment of the vehicle to safely operate the pyrotechnic element in case of the collision.

According to the present disclosure, an occupant protecting method for a vehicle is also presented. The method comprises, but not necessarily in this order:

generating crash monitoring data, determining a crash type based on the crash monitoring data, in case of a collision of the vehicle, and operating an actuator unit to adjust a position of a seat assembly based on the crash type.

The actuator unit comprises a pyrotechnic element and the actuator unit is arranged at the seat assembly.

According to the present disclosure, a computer program element may be also presented. The computer program element may be configured for an occupant protecting system as described above. The program element may be adapted to perform the method steps as described above, when being executed by a processing element.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

DESCRIPTION OF EMBODIMENTS

Figure 1:
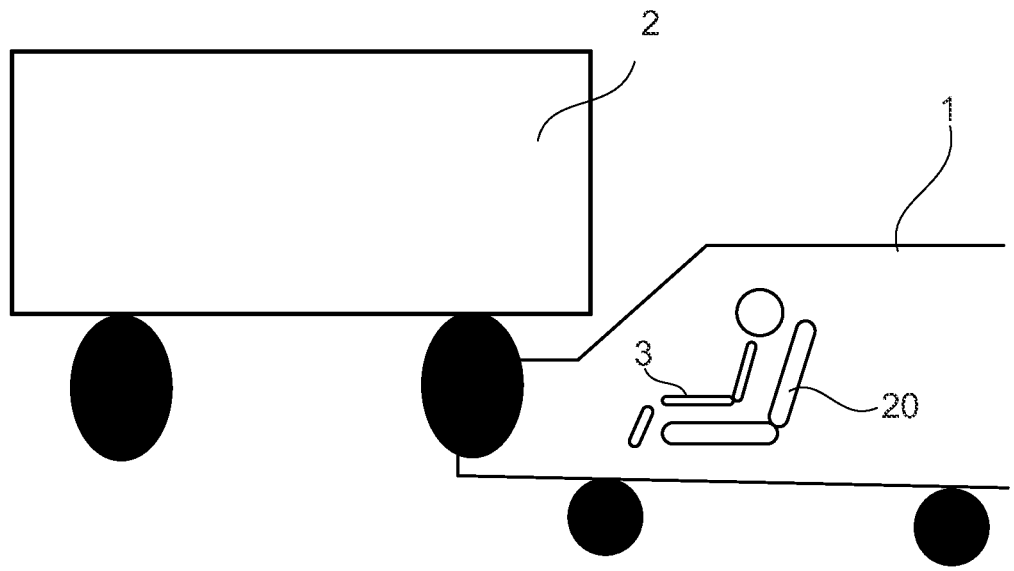
FIG. 1 shows schematically and exemplarily a vehicle in an underride situation.

FIG. 1 shows a vehicle 1, particularly a passenger vehicle in an underride crash situation. In the underride crash situation, the vehicle 1 is at least partially slidable underneath of an object 2. The object 2 may be a truck, which has a much bigger dimension than the passenger vehicle. In case of a collision between the passenger vehicle and the truck, the passenger vehicle may be at least partially drawn under the truck due to a height difference between the two crashed vehicles.

Figure 2:
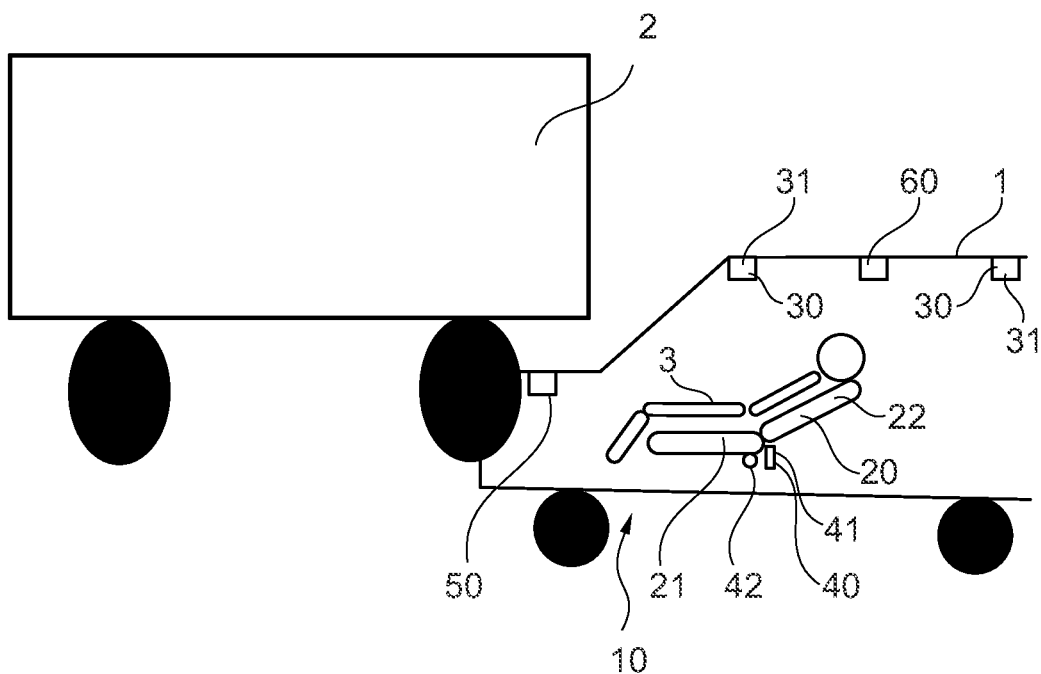
FIG. 2 show schematically and exemplarily an embodiment of a vehicle according to the present disclosure.

FIG. 2 shows the vehicle 1 comprising an occupant protecting system 10. The occupant protecting system 10 comprises at least one seat assembly 20, a sensor unit 30, at least one actuator unit 40 and a control unit 50.

The occupant protecting system 10 comprises one or more seat assemblies 20. Each seat assembly 20 comprises a seat portion 21 and a backrest portion 22. The seat portion 21 is movable in a horizontal direction and/or vertical direction relative to a driving direction of the vehicle 1. The backrest portion 22 is arranged at the seat portion 21 pivotably relative to the seat portion 21. The seat portion 21 and the backrest portion 22 may be separately or together adjusted.

Each seat assembly 20 comprises an individual actuator unit 40 configured to adjust a position of the seat assembly 20. The actuator unit 40 comprises a pyrotechnic element 41, which can be immediately ejected if activated.

The sensor unit 30 comprises a plurality of sensor elements 31 arranged inside and/or outside the vehicle 1 to generate environmental monitoring data, vehicle operation data and/or cabin monitoring data, which may form together crash monitoring data. Particularly, the environmental monitoring data can comprise field data including geographic position data and/or crash geometric data of the vehicle 1 and/or the crashed object 2.

The environmental monitoring data and/or cabin monitoring data may be generated by the sensor elements 31 comprising at least one of a lidar element, a radar element, an ultrasonic element, or an optical imaging element. Meanwhile, the vehicle operation data may be generated by the sensor elements 31 comprising at least one vehicle motion sensor element including at least one of an acceleration sensor element, a brake sensor element or the like.

The control unit 50 may be an electronic control unit (ECU) of the vehicle 1 and configured to receive the crash monitoring data generated by the sensor unit 30. The control unit 50 may classify a crash type, for instance an underride type, based on the crash monitoring data. During driving, the seat assembly 20 is generally set substantially upright such that head of an occupant 3 may crash severely against the crashed object 2 as shown in FIG. 1. In such a case however, the control unit 50 actuates the actuator unit 40 and/or the pyrotechnic element 41 to immediately adjust the position of the seat assembly 20 with respect to the crash type determined based on the crash monitoring data.

The position of the seat assembly 20 may be a height of the seat portion 21 and/or an angle between the seat portion 21 and the backrest portion 22. The actuator unit 40 and/or the pyrotechnic element 41 is capable to adjust the angle of the backrest portion 22 of the seat assembly 20 relative to the seat portion 21 based on the crash type determined by the control unit 50. In particular, the backrest portion 22 of the seat assembly 20 may be immediately reclined at 180° relative to the seat portion 21 in case of the underride crash.

Additionally or alternatively, the actuator unit 40 is able to adjust the height of the seat assembly 20 based on the crash type determined by the control unit 50. In particular, the seat portion 21 may be immediately reduced if the head of the occupant 3 may be endangered by the impending crash.

The occupant protecting system 10 further comprises at least one airbag unit 60 arrangeable in the vehicle 1. The airbag unit 60 comprises at least one of a front airbag element, a knee airbag element, a lateral airbag element or an inflammatory side curtain. In general, the airbag unit 60 is a safety device for occupants 3 to minimize injury caused by directly striking between the occupant 3 and a vehicle structure in case of a vehicle collision. Hence, in addition to the adjustment of the position of the seat assembly 20, e.g. the height of the seat portion 21 and/or the angle of the backrest portion 22 in case of the vehicle collision, the occupant protecting system 10 may activate the airbag unit 60 to protect the occupant in the vehicle 1.

The control unit 50 can selectively cause at least one of the actuator unit 40 of each seat assembly 20 or the airbag unit 60 based on the crash type of the collision of the vehicle 1.

The occupant protecting system 10 further comprises an activating means 42 configured to manually activate the pyrotechnic element 41 to adjust the position of the seat assembly 20. The activating means 42 may allow the occupant 3 to activate the pyrotechnic element 41 manually, if the occupant 3 fears the impending collision and/or the control unit 50 has any malfunction. The activating means 42 may be formed as a button, switch or the like.

The control unit 50 may be further configured to determine space required to adjust the position of the seat assembly 20. For instance, the control unit 50 is configured to estimate a distance between the seat assemblies 20 for adjusting the position of each seat assembly 20 and operate at least one of actuator units 40 accordingly. Before adjusting the position of at least one seat assembly 20, the control unit 50 may assess based on the collected cabin monitoring data if one or more seat assemblies 20 to be adjusted may have enough space in the cabin to be lowered or reclined.

According to the assessment, the control unit 50 may adjust the distance between the seat assemblies 20, before adjusting the angle of the backrest portion 22 and/or the height of the seat portion 21 of the seat assemblies 20 to safely operate the pyrotechnic element 41 in case of the collision. The control unit 50 is further configured to cause the actuator unit 40 to at least partially occupy the luggage compartment for adjusting the seat assembly 20 arranged adjacent to the luggage compartment.

Accordingly, a severe injury of the occupant may be avoided and safety of occupants in the vehicle may be increased.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An occupant protecting system for a vehicle, comprising:
    a seat assembly;
    a sensor unit, wherein the sensor unit is configured to generate crash monitoring data of the vehicle;
    an actuator unit comprising a pyrotechnic element, wherein the actuator unit is arranged at the seat assembly, and is configured to adjust a position of the seat assembly; and
    a control unit, wherein the control unit is configured to:
        determine a crash type from a group of crash types based on the crash monitoring data in response to a collision of the vehicle, and
        cause the actuator unit to adjust the position of the seat assembly based on the crash type in response to the collision of the vehicle.

2. The occupant protecting system of claim 1, wherein the seat assembly comprises a seat portion and a backrest portion; and the control unit is further configured to cause the actuator unit to adjust the position of the seat portion and the backrest portion in response to the collision of the vehicle.

3. The occupant protecting system of claim 2, wherein the actuator unit is further configured to adjust an angle of the backrest portion of the seat assembly relative to the seat portion based on the crash type.

4. The occupant protecting system of claim 2, wherein the actuator unit is further configured to recline the backrest portion of the seat assembly at 180° relative to the seat portion based on the crash type.

5. The occupant protecting system of claim 4, wherein the crash type is an underride type, in which the vehicle is at least partially slidable underneath of an object.

6. The occupant protecting system of claim 1, wherein the actuator unit is further configured to adjust a height of the seat assembly based on the crash type.

7. The occupant protecting system of claim 6, wherein the actuator unit is further configured to reduce the height of the seat assembly based on the crash type.

8. The occupant protecting system of claim 1, wherein the sensor unit comprises a plurality of sensor elements, and wherein the plurality of sensor elements comprise an environment monitoring sensor element comprising at least one of a lidar element, a radar element, an ultrasonic element, or an optical imaging element.

9. The occupant protecting system of claim 8, wherein the plurality of sensor elements further comprise a vehicle motion sensor element.

10. The occupant protecting system of claim 8, wherein the plurality of sensor elements further comprise a cabin monitoring sensor element.

11. The occupant protecting system of claim 1, further comprising an airbag unit arrangeable in the vehicle, wherein the airbag unit comprises at least one of a front airbag element, a knee airbag element, a lateral airbag element, or an inflammatory side curtain.

12. The occupant protecting system of claim 11, wherein the control unit is further configured to selectively activate at least one of the actuator unit of the seat assembly or the airbag unit based on the crash type of the collision of the vehicle.

13. The occupant protecting system of claim 1, further comprising an activating means configured to manually activate the pyrotechnic element.

14. The occupant protecting system of claim 1, further comprising two or more seat assemblies, wherein each seat assembly comprises an individual actuator unit; and the control unit is further configured to operate each actuator unit of the two or more seat assemblies independently.

15. The occupant protecting system of claim 14, two seat assemblies being arrangeable in a row relative to a travelling direction of the vehicle; and the control unit is further configured to estimate a distance between the two seat assemblies for adjusting the position of each seat assembly, and cause the actuator units of the seat assemblies to adjust the distance between the two seat assemblies before adjusting the position of the two seat assemblies.

16. A vehicle, comprising:
    an occupant protecting system, wherein the occupant protecting system comprises:
        a seat assembly;
        a sensor unit, wherein the sensor unit is configured to generate crash monitoring data of the vehicle;
        an actuator unit comprising a pyrotechnic element, wherein the actuator unit is arranged at the seat assembly, and is configured to adjust a position of the seat assembly; and
    a control unit, wherein the control unit is configured to:
        determine a crash type from a group of crash types based on the crash monitoring data in response to a collision of the vehicle, and
        cause the actuator unit to adjust the position of the seat assembly based on the crash type in response to the collision of the vehicle.

17. The vehicle of claim 16, wherein the actuator unit is further configured to recline a backrest portion of the seat assembly at 180° relative to a seat portion in response to an underride type of the crash type of the collision of the vehicle.

18. The vehicle of claim 16, wherein the occupant protecting system further comprises an airbag unit arrangeable in the vehicle; and the control unit is further configured to selectively activate at least one of the actuator unit of the seat assembly or the airbag unit based on the crash type of the collision of the vehicle.

19. The vehicle of claim 16, further comprising a luggage compartment; and the control unit is further configured to cause the actuator unit to at least partially occupy the luggage compartment for adjusting the seat assembly arranged adjacent to the luggage compartment.

20. An occupant protecting method for a vehicle, comprising:
- generating crash monitoring data;
- determining a crash type from a group of crash types based on the crash monitoring data, in case of a collision of the vehicle; and
- causing an actuator unit to adjust a position of a seat assembly based on the crash type, wherein the actuator unit comprises a pyrotechnic element, and the actuator unit is arranged at the seat assembly.

* * * * *